(12) United States Patent
Newrones et al.

(10) Patent No.: US 8,177,700 B2
(45) Date of Patent: May 15, 2012

(54) METHOD FOR MAKING A VALVE FOR SEALING AN EVACUATION PORT

(75) Inventors: Ronald Newrones, Brecksville, OH (US); Richard L. Sandt, Brunswick, OH (US); Ronald F. Sieloff, Chardon, OH (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 13/034,138

(22) Filed: Feb. 24, 2011

(65) Prior Publication Data

US 2011/0138744 A1    Jun. 16, 2011

Related U.S. Application Data

(62) Division of application No. 12/703,212, filed on Feb. 10, 2010, which is a division of application No. 11/100,014, filed on Apr. 6, 2005, now Pat. No. 7,685,793.

(51) Int. Cl.
*B65B 31/04* (2006.01)

(52) U.S. Cl. .......... 493/213; 53/432; 383/44; 206/524.8

(58) Field of Classification Search ............... 493/87, 493/213; 53/405, 432, 434, 403, 408, 79, 53/105; 215/262, 307, 228; 220/231, 360, 220/367.1, 913, 745, 750; 383/3, 96, 103, 383/44, 45, 52; 251/82, 95, 100; 137/246.16, 137/246, 903, 904, 907; 141/65, 66
See application file for complete search history.

(56) References Cited

U.S. PATENT DOCUMENTS

| | | | | | |
|---|---|---|---|---|---|
| 2,604,297 | A | * | 7/1952 | Winstead | 137/223 |
| 2,927,722 | A | * | 3/1960 | Metzger | 383/94 |
| 6,513,659 | B1 | * | 2/2003 | Ogura et al. | 206/524.8 |
| 6,591,429 | B1 | * | 7/2003 | Jaszai | 2/455 |
| 6,662,827 | B1 | * | 12/2003 | Clougherty et al. | 137/859 |
| 7,178,555 | B2 | * | 2/2007 | Engel et al. | 137/852 |
| 7,331,715 | B2 | * | 2/2008 | Miller et al. | 383/103 |

* cited by examiner

*Primary Examiner* — Hemant M Desai
(74) *Attorney, Agent, or Firm* — Avery Dennison Corporation

(57) ABSTRACT

A valve (20) is provided for sealing an evacuation port (16) in a port area (18) of a wall structure (12) of a container. The valve (20) comprises a casing (22) having a shell portion (30) which is deformable from an open condition, whereat the shell portion (30) forms a chamber (32) over the port area (18), and a closed condition, whereat the shell portion (30) contacts the port area (18). When the shell portion (30) is in its open condition, gas exits from the chamber (32) through gas-releasing holes (24) in the casing (22). When the shell portion (30) is deformed to its closed condition, a port-sealing adhesive (26) adheres to the port area (18) to thereby seal the evacuation port (16).

12 Claims, 6 Drawing Sheets

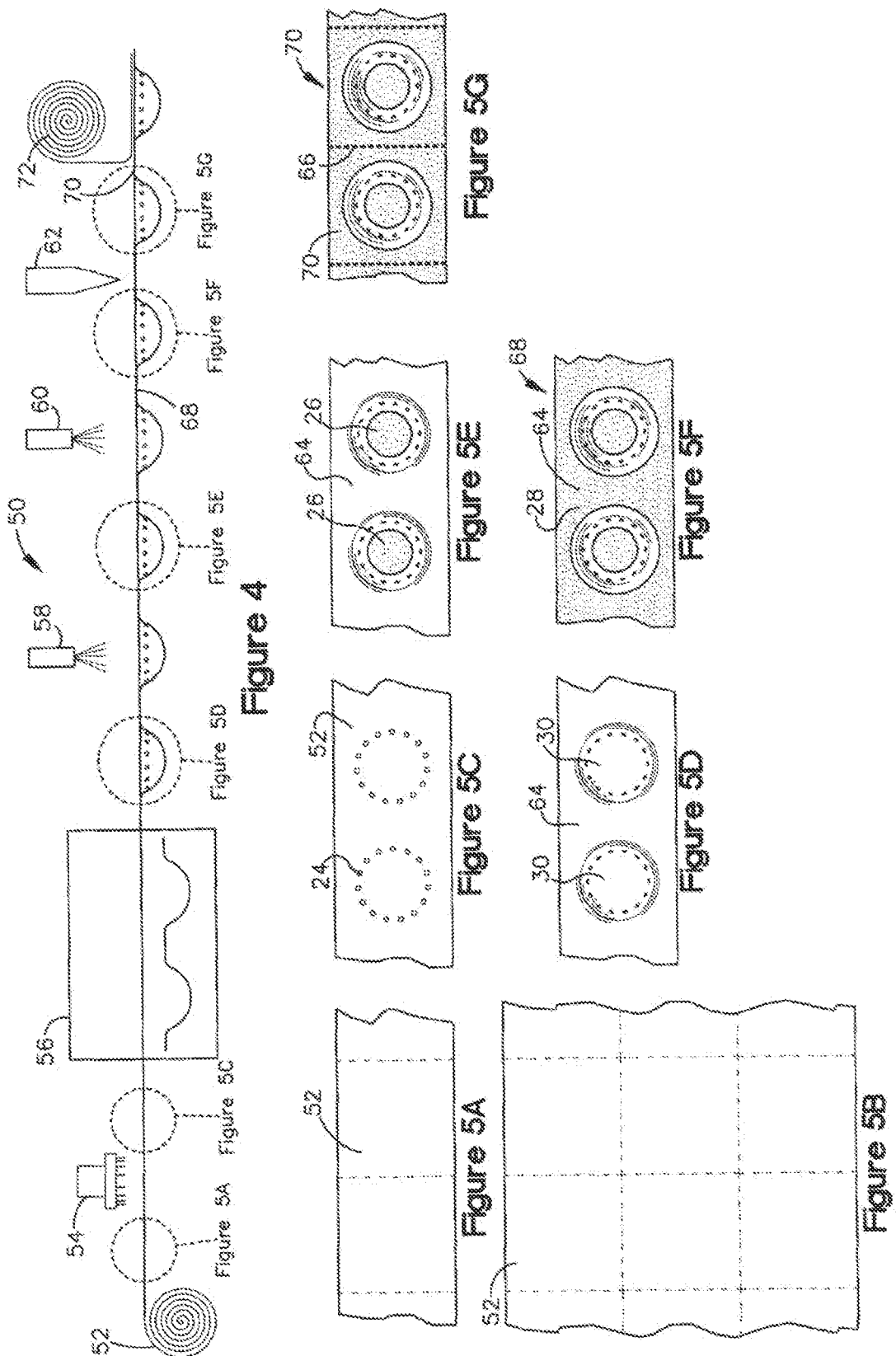

METHOD FOR MAKING A VALVE FOR SEALING AN EVACUATION PORT

CROSS-REFERENCE TO RELATED APPLICATIONS

The present application is a Division of U.S. patent application Ser. No. 12/703,212 filed Feb. 10, 2010, which is a Division of U.S. patent application Ser. No. 11/100,014 filed Apr. 6, 2005, now U.S. Pat. No. 7,685,793, issued on Mar. 30, 2010, which applications are incorporated herein by reference in their entirety.

FIELD OF THE INVENTION

The present invention relates generally, as indicated, to an evacuatable container and, more particularly, to a container having an evacuation port that is opened to remove gas from the container and sealed once gas removal is complete.

BACKGROUND OF THE INVENTION

A container, such as a flexible plastic bag, is often used as a receptacle to contain a commodity. To provide optimum storage conditions for the commodity, it is often desirable for gas (e.g., air) to be removed from the receptacle. If so, the container can include an evacuation port through which gas can pass from the receptacle to the outside environment. In some situations, it is desirable to seal the evacuation port after gas-removal to maintain the evacuated condition of the receptacle.

SUMMARY OF THE INVENTION

A valve structure allows an evacuation port of a container to be opened during gas-removal steps and closed thereafter to maintain the evacuated condition of the receptacle. A plurality of the valve structures can be efficiently and economically mass-produced separately from the manufacture of the rest of the container and incorporated therewith during latter manufacturing stages. Moreover, the incorporation of the valve structure into the container is compatible with conventional container-making and container-filling techniques whereby, quite significantly, this incorporation will not significantly compromise conventional (and typically quick) manufacturing speeds.

More particularly, a valve is provided for sealing an evacuation port in a port area of a wall structure of a container. The valve comprises a casing, gas-releasing holes, and a port-sealing adhesive. The casing has a shell portion which is deformable from an opened condition, whereat it forms a chamber over the port area, and a closed condition, whereat it contacts the port area. The gas-releasing holes allow gas to exit from the chamber when the shell portion is in the opened condition. The port-sealing adhesive adheres the shell portion to the port area when it is in the closed condition to thereby seal the evacuation port.

These and other features of the invention are fully described and particularly pointed out in the claims. The following description and drawings set forth in detail certain illustrative embodiments of the invention which are indicative of but a few of the various ways in which the principles of the invention may be employed.

BRIEF DESCRIPTION OF THE DRAWINGS

FIG. 4 is a schematic view of system for making a plurality of the valve structures.

FIGS. 5A-5G are close-up views of the valve sheet material during various production stages.

DETAILED DESCRIPTION OF THE INVENTION

Figure 1:
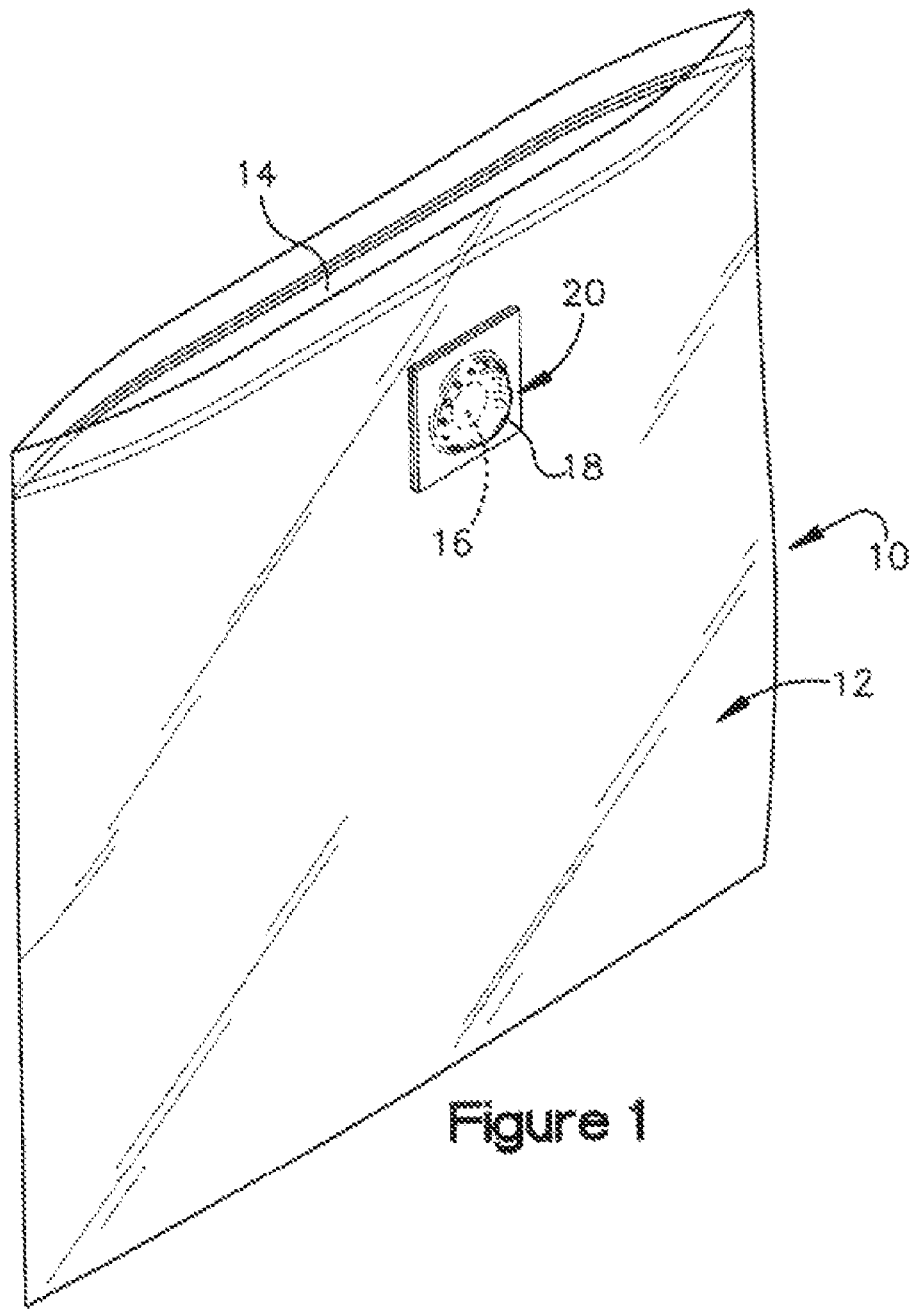
FIG. 1 is a perspective view of a container according to the present invention, the container including a valve structure

Referring now to the drawings, and initially to FIG. 1, a container 10 according to the present invention is shown. The container 10 comprises a wall structure 12 defining a receptacle 14 for containing a commodity. An evacuation port 16 is provided in the wall structure 12 to allow gas to pass from the receptacle 14 to an outside environment. A region of the wall structure 12 surrounding the evacuation port 16 can be referred to as the port area 18 of the container 10 and/or the wall structure 12. The container 10 further comprises a valve 20 for sealing the evacuation port 16 after gas has been removed from the receptacle 14.

Figure 2A:
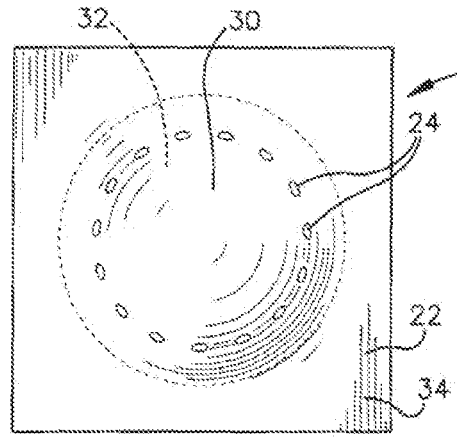
FIGS. 2A-2C are top, side, and bottom views, respectively of the valve structure.
Figure 2C:
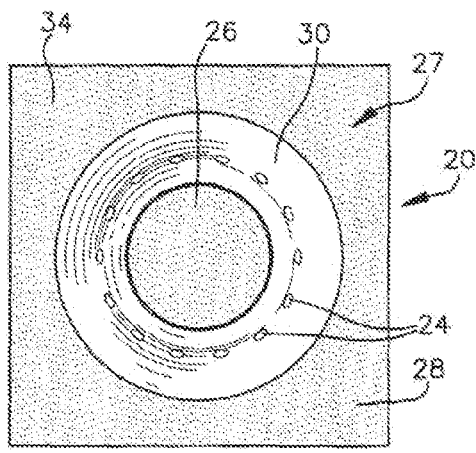
Figure 2B:
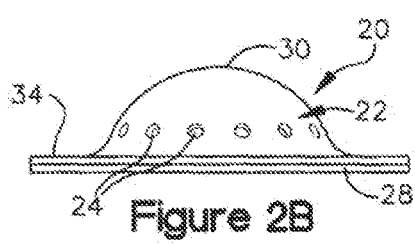

Referring now additionally to FIG. 2A-2C, the valve 20 is shown isolated from the rest of the container 10. The valve 20 comprises a casing 22, gas-releasing holes 24 in the casing 22, and a port-sealing adhesive 26. The valve 20 can further comprise a container-attaching adhesive 28 for attaching the casing 22 to the container wall structure 12.

Figure 3A:
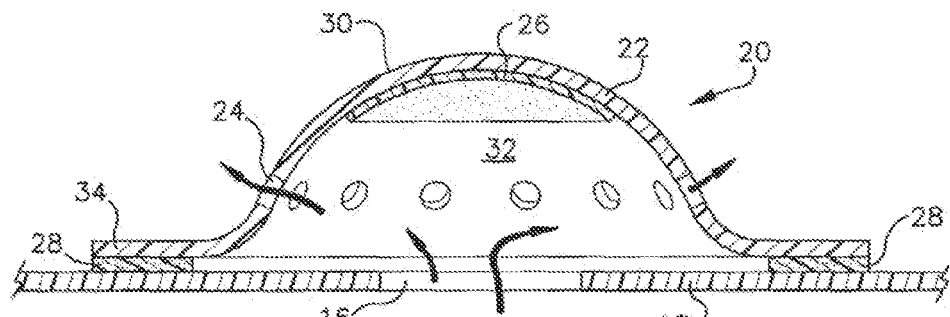
FIGS. 3A and 3B are sectional views of the valve structure installed on the container, the valve structure being shown in an opened condition, and a closed condition, respectively.
Figure 3B:
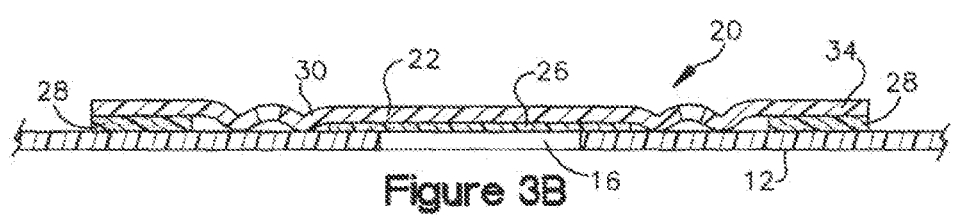

Referring now to FIGS. 3A and 3B, the valve 20 is shown in an opened condition and a closed condition, respectively. The casing 22 has a shell portion 30 which, in the open condition shown in FIG. 3A (and also FIGS. 2A-2C), forms a chamber 32 over the port area 18. During evacuation of the container 10, gas will pass through the evacuation port 16, into the chamber 32, and then through the gas-releasing holes 24 to the outside environment. In the closed condition in FIG. 3B, the shell portion 30 is deformed (e.g., crushed, flattened, etc.) to place the valve 20 in the closed condition shown in FIG. 3B, whereat it contacts the port area 18. In this closed condition, the adhesive 26 adheres the shell portion 30 to the port area 18 to thereby seal the evacuation port 16.

In the illustrated embodiment, the shell portion 30 has a semi-spherical shape in the opened condition and forms a dome-like structure over the port area 18. The gas-releasing openings 24 are located around the base of this dome in a pattern/frequency to provide the desired gas flow rate. The port-sealing adhesive 26 is located on the inner surface of the shell portion 30, in a pole area aligned with the port area 18.

Also in the illustrated embodiment, the casing 22 includes a rim portion 34 extending radially outward from the base of the shell portion 30. The rim portion 34 can be round or, as shown, take on a polygonal shape as this might be more compatible with manufacturing methods. In any event, the container-attaching adhesive 28 is located at least on the bottom surface (e.g., the container-adjacent surface) of this rim portion 34.

Referring now to FIG. 4, a system 50 for making a plurality of the valve structures 20 is shown. In this system 50, a thermoplastic resin sheet 52 is provided for forming the casings 22 of the valves 20. If a single row of valves 20 is to be produced, the sheet 52 would preferably have a width corresponding to the width or length of the rim portions 34. (See FIG. 5A.) If multiple rows of valves are to be produced, the sheet 52 could have a width corresponding to this multiple times the width/length of the rim portions 34. (See FIG. 5B.)

The illustrated system 50 includes a punching station 54, a forming station 56, adhesive-printing stations 58 and 60, and a cutting station 62. At the punching station 54, the gas-releasing openings 24 are formed in the sheet 52. (See FIG. 5C.) The forming station 56 is a preferably a thermoforming station and, more preferably, a vacuum thermoforming station. The shell portions 30 of the casing 20 are formed at this station 56, with the "unformed" remaining portion 64 of the sheet 52 corresponding to the rim portions 34. (See FIG. 5D.) The port-sealing adhesive 26 is printed at the station 58 and the container-attaching adhesive 28 is printed at station 60. (See FIGS. 5E and 5F.) The cutting station 62 then forms perforations 66 (or other designed weaknesses) in the sheet 52 to define the separate valves 20. (See FIG. 5G.)

The punching, printing, forming, and separating steps can be provided at different points in the valve-manufacturing method, both in-line with, or prior to, the valve-making system 50. For example, the gas-releasing openings 24 can be provided in the sheet 52 as supplied, can be punched in the sheet 52 after the forming station 56 (before, after, or between the adhesive printing stations 58/60), and could even be formed after the cutting station 62. The port-sealing adhesive 26 and/or the container-attaching adhesive 28 could be provided in the sheet 52 as supplied, printed before the forming station 56, printed after the forming station 56, and/or after the cutting station 62. The port-sealing adhesive 26 and the container-attaching adhesive 28 can be printed only in their appointed patterns, as shown, or one adhesive 26/28 can cover the entire surface of the sheet 52, with the other adhesive 28/26 being printed thereover.

Prior to the illustrated cutting step, a strip product 68 is formed which comprises a plurality of casings 22 formed in the sheet 52, the container-attaching adhesive 28 printed within the casings 22, and the container-attaching adhesive 28 printed on the shells-surrounding portion 64 of the sheet. (See FIG. 5F.) This strip product 68 can be provided to a container-manufacturer for subsequent severing into the individual valves 20 at the container-manufacturing location. Alternatively, as is illustrated, a strip product 70 can be provided to the container-manufacturer with the perforations 66 formed therein. (See FIG. 5G.) In either case, a release liner 72 could be placed on top of the strip 68/70 to temporarily cover the container-attaching adhesive 28. (See FIG. 5.)

Figure 6A:
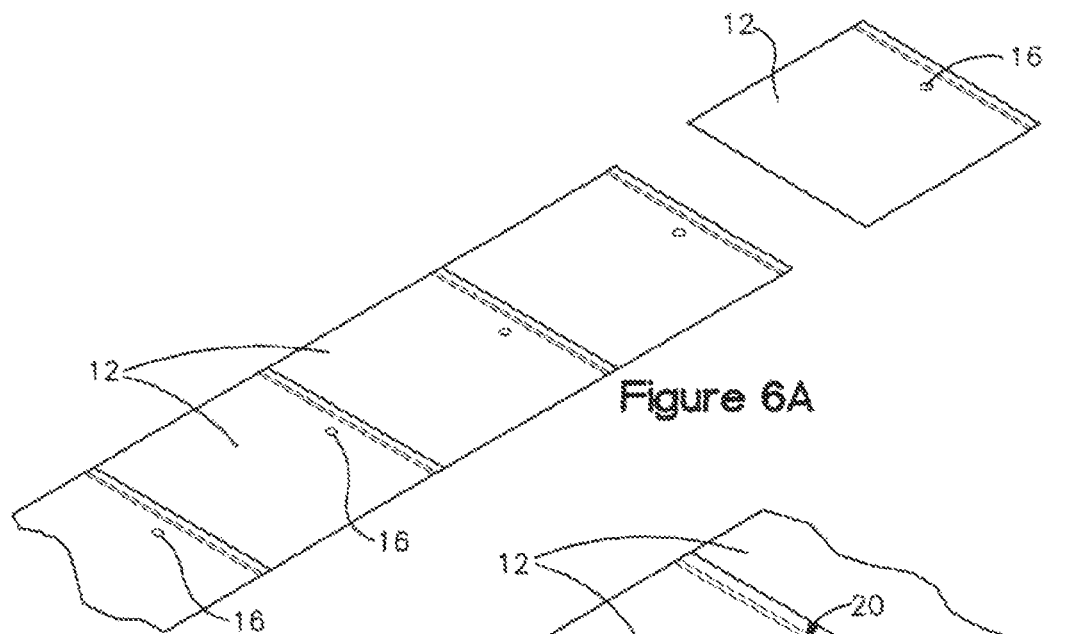
FIGS. 6A-6B are schematic views of a method of making the containers.
Figure 6B:
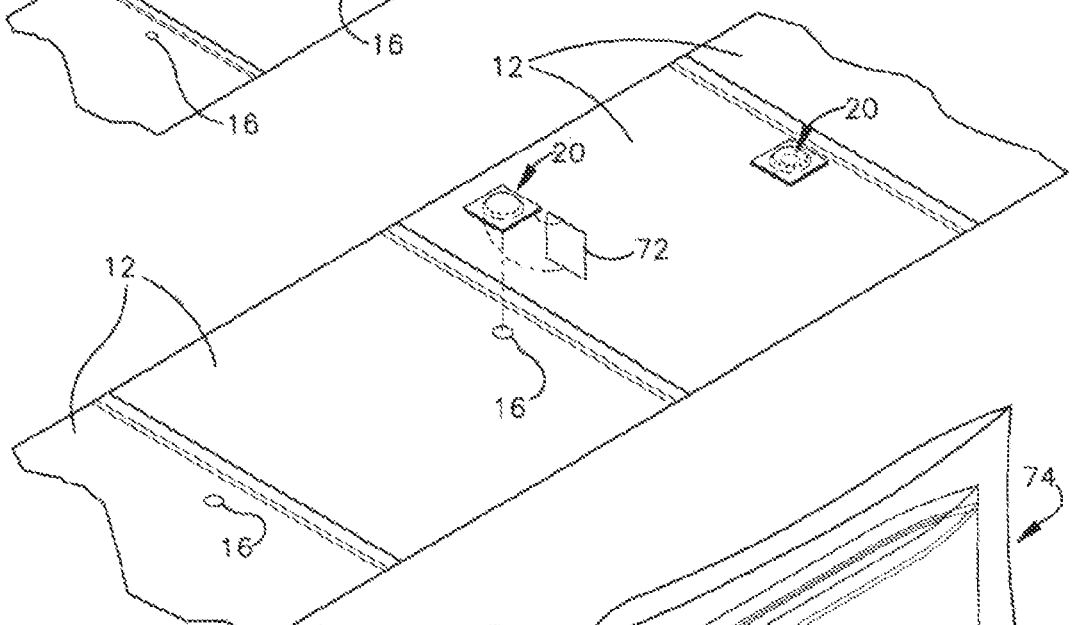

The above-discussed strip products 68/70 lend themselves to automatic incorporation into the containers 10 during a conventional container-manufacturing process. For example, as shown in FIGS. 6A and 6B, the wall structures 12 of the containers 10 can be separately mass-manufactured in a continuous strip wherein, for example, the bottom seam of one wall structure 12 abuts against the top seam of the adjacent downstream wall structure 12. (FIG. 6A). Before, after, or during creation of the wall structure 12, the evacuation port 16 can be cut or otherwise formed in the wall structure 12. The release liner 72 can be removed from the rim portion 34 of the valve 20, the valve 20 aligned with the evacuation port 16 and secured to the wall structures 12. (FIG. 6B). The removal, aligning, and securing step can be performed automatically (i.e., by a machine, not shown) or can be performed manually (i.e., by a person, not shown). The wall structures 12 can be separated from each other by a severing device (not shown), either before or after the label-securing step.

Figure 7:
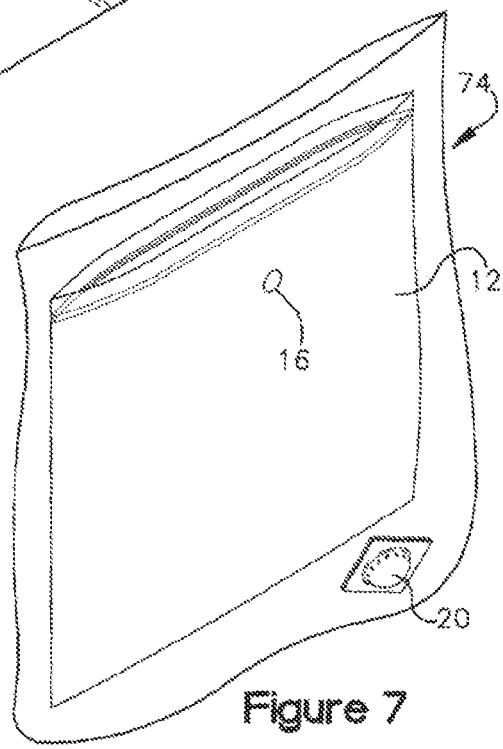
FIG. 7 is a perspective view of kit for assembly the container.

Alternatively, the strip product 68 can be severed or otherwise separated and the valves 20 provided as individual units to the container-manufacturer. The latter approach may be desirable if the container-manufacturer is planning to provide the container 10 as a kit 74 (comprising the wall structure 12 and the valve 20) that is assembled by the user. (See FIG. 7.)

Figure 8A:
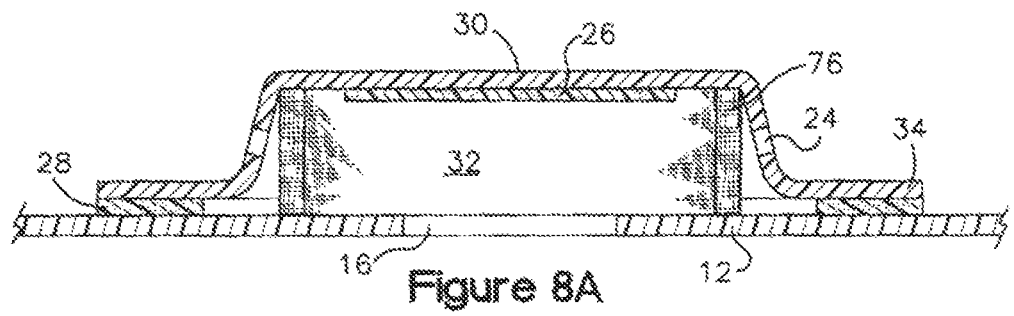
FIGS. 8A-8C are sectional views similar to FIGS. 3A-3B, except that the valve includes a supporting gasket.
Figure 8B:
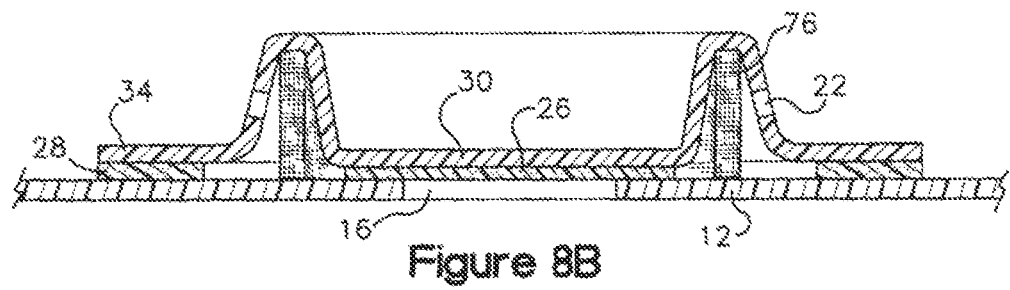
Figure 8C:
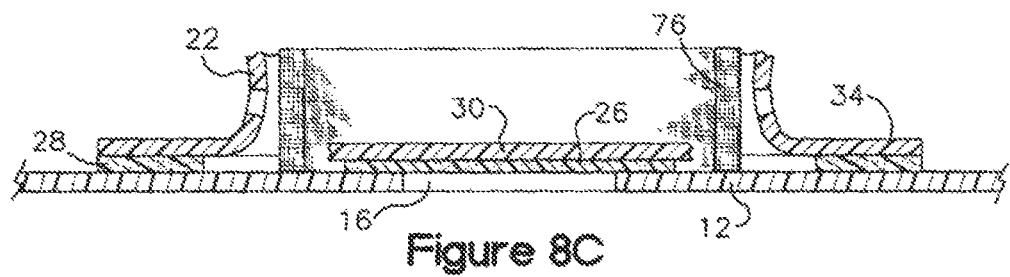

Referring now to FIGS. 8A-8C, another valve 20 is shown which does not require the casing 22 itself to maintain the shell portion 30 in the opened condition. Specifically, the valve 20 includes a gasket 76 or other supporting structure which is positioned between the wall structure 12 and the casing 22 to hold the shell portion 30 away from the evacuation port 16. The gasket 76 is gas-permeable so that gas can pass therethrough during evacuation and is shaped to at least partially surround the evacuation port 16 (e.g., it is annular). For example, in the illustrated embodiment, the gasket 76 is made of a screen-like material.

During evacuation, gas passes from receptacle 14, through the gasket 76, and through the gas-releasing openings 24. See FIG. 8A.) To seal the evacuation port 16, the shell portion 30 is pushed into the center of the gasket 76. (FIGS. 8B and 8C.) If the casing material is flexible enough, the casing 22 can remain intact when the shell portion 30 is pushed to the closed condition and the gasket 76 will remain therewith after sealing. (FIG. 8B.) Alternatively, the casing 22 can break, tear, or fracture and allow the gasket 76 to be removed. (FIG. 8C.)

If the valve 20 shown in FIG. 8A is to be automatically incorporated into containers 10 during a conventional container-manufacturing process (see e.g., the process shown schematically in FIGS. 6A-6B), the gasket 76 would need to be placed around the evacuation port 16 prior to attaching the casing 22 to the wall structure 12. If the valve 20 shown in FIG. 8A is to be provided as a kit (see e.g., the kit 74 shown in FIG. 7), the kit would include the bag structure 12, the casing 22, and the gasket 76. Also, a valve design wherein the gasket 76 is attached to the casing 22 and integral with the rest of the valve 20 is possible with, and contemplated by, the present invention.

The sheet 52 (and thus the valve casing 22) can be made of any suitable material, such as, for example, polyethylenes, polypropylenes (high, mid and low density), polystyrenes, ABS resins, methacrylates, vinyl chlorides, polyethylene terephthalates, polybutylene terephthalates, AS resins, EVA resins, cellulose acetates, polycarbonates, polyamides, polyacetal resins, modified polyphenylene oxides, polysulfone resins and the like.

The port-sealing adhesive 26 and/or the container-attaching adhesive 28 can comprise a pressure sensitive adhesive (PSA), such as a silicone-based PSA, a rubber-based PSA, and an acrylic-based PSA, and can be provided as a hot melt, an emulsion, an aqueous dispersion, a solvent solution, or a film membrane. Moreover, the container-attaching adhesive 28 may not be necessary in some applications. For example, an attaching adhesive could be provided on the container wall structure 12 and/or the valve 20 could be non-adhesively attached (e.g., heat sealed) during the valve-incorporating steps of the container-making process.

The release liner 72 can be a sheet of paper or polymeric film having a release coating, such as a silicone release coating.

The gasket 76 can be made of plastic, metal, paper or any other material which provides the necessary support for the casing 22 in the open condition. The gas-permeability of the gasket 76 can be accomplished by openings formed in the gasket material and/or by the permeability of the gasket material itself.

The valve 20 allows gas to be selectively removed from the receptacle 14 of the container 10 to provide optimum storage conditions for a commodity stored therein. For example, a vacuum chamber can be placed around the valve 20 outside of the receptacle 14, with the vacuum pulling the gas through the evacuation port 16, into the chamber 32, and through the gas-releasing openings 24. Additionally or alternatively, pressure from inside the receptacle 14 can (either by squeezing the container 10 or from the commodity within the receptacle experiencing a volume change) push the gas through this evacuation route. The deformation of the shell portion 30 to place the valve 20 in its closed condition can be accomplished manually by a user simply pushing down on the shell portion 30 with, for example, his/her thumb. Alternatively, a plunger or other type of pushing device can be employed to accomplish this conversion.

Figures 9A, 9B:
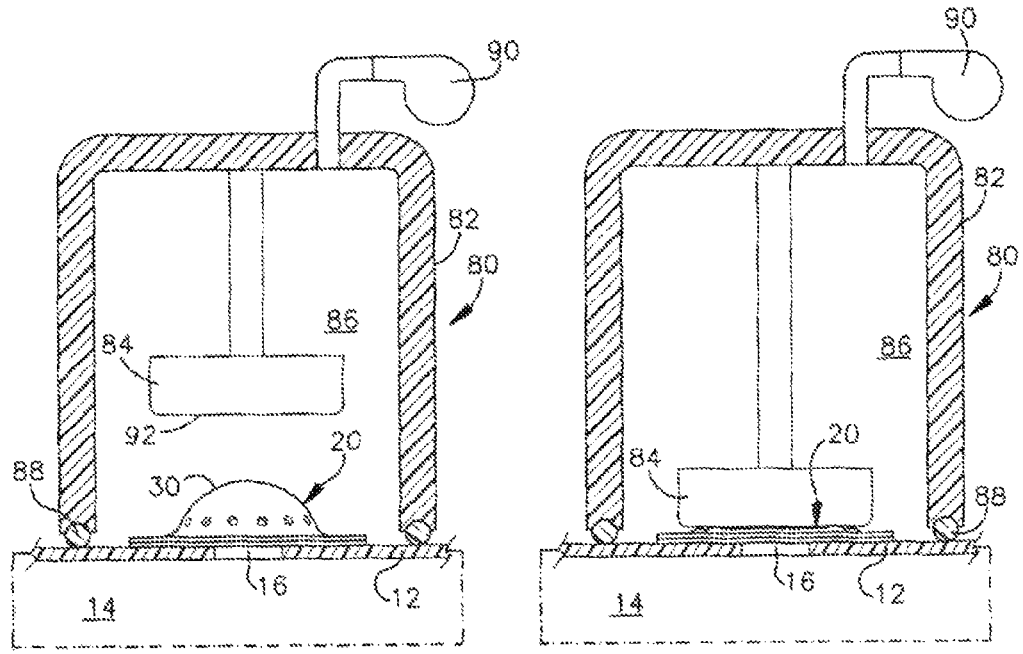
FIGS. 9A-9C are schematic views of an evacuation/sealing device according to the present invention.

Referring now to FIGS. 9A and 9B, an evacuating/sealing device 80 according to the present invention is shown. The evacuating/sealing device 80 comprises a housing 82 and a plunger 84 which together coordinate to allow the container 10 to be evacuated when the valve 20 is in its open condition and to convert the valve 20 to its closed condition upon completion of evacuation. The device 80 can be designed to allow a vacuum to be held on the valve 20 until it is in its closed condition and the evacuation port 16 is sealed. In this manner, gas cannot re-enter the receptacle 14 during the time it takes to seal the port 16 after evacuation.

The housing 82 has an open end which can be sealably positioned on the wall structure 12 around the valve 20 to form a vacuum chamber 86. For example, as illustrated, a foam or rubber seal 88 can be used. The vacuum chamber 86 is connectable to a vacuum source 90 whereby gas can be evacuated from the receptacle 14. The plunger 84 is movable between a retracted rest position, whereat it is removed from the valve 20, and a sealing position, whereat its pushing surface 92 is positioned flush with (or just above flush) the wall structure 12. As the plunger 84 is extended to move from the rest position to the sealing position, its pushing surface pushes the shell portion 30 of the valve 20 into its sealing condition.

To operate the evacuating/sealing device 80, the housing 82 is placed over the port area 18 so that the vacuum chamber 86 is positioned around the valve 20. With the plunger 84 in its rest position a vacuum is pulled by connection of the chamber 86 to the vacuum source 90, whereby gas is removed from the receptacle 14 of the container 10. Thereafter, the plunger 84 is moved to its sealed position to convert the valve 20 to its closed condition and seal the evacuation port 16.

Figure 9C:
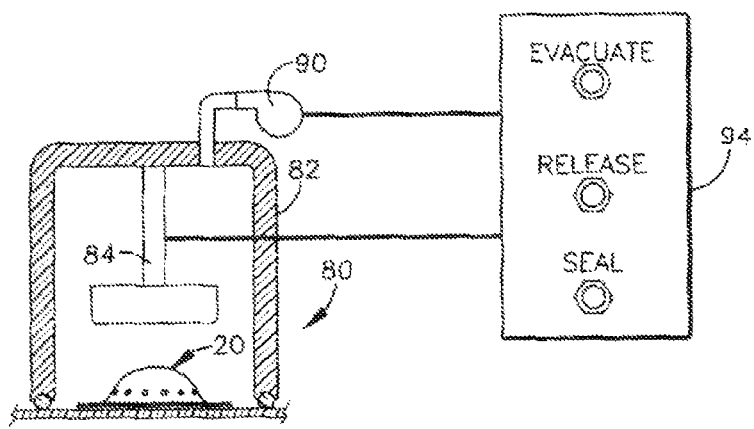

A controller 94 may be provided that is operably connected to the vacuum source 90 (or a switch controlling communication between the chamber 86 and the vacuum source) and/or is operably connected to the plunger 84. (See FIG. 9C.) The evacuating/sealing device 80 can be automatically controlled to operate in an evacuate mode, a seal mode, and a release mode. In the evacuate mode, the valve 20 is in its opened condition, a vacuum is being pulled through the chamber 86 to evacuate the receptacle 14, and the plunger 84 is in its rest position. In the seal mode, the vacuum is maintained, and the plunger 84 is moved to its sealing position to convert the valve 20 to its closed condition. In the release mode, the vacuum is removed, and the plunger 84 is returned to its rest position.

One may now appreciate the present invention provides a valve structure that allows an evacuation port of a container to be open during gas-removal steps and closed thereafter to maintain the evacuated condition of the receptacle. Although the invention has been shown and described with respect to certain preferred embodiments, it is obvious that equivalent and obvious alterations and modifications will occur to others skilled in the art upon the reading and understanding of this specification. The present invention includes all such alterations and modifications and is limited only by the scope of the following claims.

What is claimed is:

1. A method for making a valve for sealing an evacuation port in a port area of a wall structure of a container, wherein the method comprises:
   providing a sheet of material;
   forming a shell portion in a casing in the sheet which are deformable from an open condition, whereat the shell portion forms a chamber over the port area, and a closed condition, whereat the shell portion contacts the port area;
   forming a gas-releasing opening in the casing, through which gas exits from the chamber when the shell portion is in the opened condition;
   providing a supporting structure positioned between the casing and a wall structure; and
   printing a port-sealing adhesive on the sheet adhering the shell portion to the port area when the shell portion is in the closed condition, to thereby seal the evacuation port.

2. The method as set forth in claim 1, wherein the casing is constructed from materials including polyethylene, polypropylenes, polystryenes, ABS resins, methacrylates, vinyl chlorides, polyethylene terephthalates, polybutylene terephthalates, AS resins, EVA resins, cellulose acetates, polycarbonates, polyamides, polyacetal resins, modified polyphenylene oxides, polysulfone resins and combinations thereof.

3. The method as set forth in claim 1, wherein the port sealing adhesive is selected from a group including silicone based pressure sensitive adhesive, rubber based pressure sensitive adhesive, acrylic based pressure sensitive adhesive or combinations thereof.

4. The method as set forth in claim 1, wherein the port sealing adhesive is aligned over the evacuation port.

5. The method as set forth in claim 1, wherein the forming step comprises thermoforming the shell portion of the casing in the sheet.

6. The method as set forth in claim 5, further comprising the step of punching the gas-releasing opening in the sheet.

7. A valve-making system for making a plurality of the valves set forth in claim 1, the system comprising a forming station for forming the shell portion of the casing in a sheet.

8. The valve-making system as set forth in claim 7, further comprising a punching station for punching the gas-releasing opening in the sheet.

9. The valve-making system as set forth in claim 8, further comprising an adhesive-printing station for printing the port-sealing adhesive on the sheet.

10. A method of making a plurality of the containers having a plurality of valves set forth in claim 1, the method comprising the steps:
    making a plurality of wall structures; and
    attaching the valves to the wall structures.

11. The method as set forth in claim 10, further comprising the step of making a strip product containing the plurality of the valves and separating the strip product into individual valves for attachment to the respective wall structures.

12. The method as set forth in claim 10, wherein the strip product is made by a valve-manufacturer at a first location, wherein the wall-making step is performed by a container-manufacturer at a second location, and wherein the attaching step is performed by the container-manufacture at the second location.

* * * * *